United States Patent [19]
Mudge

[11] Patent Number: 4,644,164
[45] Date of Patent: Feb. 17, 1987

[54] COMPACT PASSIVE INFRARED INTRUSION SENSOR

[75] Inventor: Philip H. Mudge, Brookfield, Conn.

[73] Assignee: Cerberus AG, Mannedorf, Switzerland

[21] Appl. No.: 688,920

[22] Filed: Jan. 4, 1985

[51] Int. Cl.[4] .......................... G08B 13/18; G01J 1/04
[52] U.S. Cl. ..................................... 250/353; 250/342
[58] Field of Search ................. 250/342, 353; 340/567

[56] References Cited

U.S. PATENT DOCUMENTS

| | | | |
|---|---|---|---|
| Re. 29,882 | 12/1976 | Schwarz | 250/342 |
| 3,005,914 | 10/1961 | Feldman et al. . | |
| 3,007,050 | 10/1961 | Green et al. . | |
| 3,069,546 | 12/1962 | Buntenbach . | |
| 3,476,938 | 11/1969 | Jankowitz et al. . | |
| 3,524,180 | 8/1970 | Cruse . | |
| 3,631,434 | 12/1971 | Schwartz . | |
| 3,703,718 | 11/1972 | Berman . | |
| 3,886,359 | 5/1975 | Cheek, Jr. et al. | 250/342 |
| 3,955,184 | 4/1976 | Cinzori et al. . | |
| 4,081,680 | 3/1978 | Keller | 250/342 |
| 4,238,675 | 12/1980 | Turlej et al. | 250/353 |
| 4,263,585 | 4/1981 | Schaefer | 250/342 |
| 4,268,752 | 5/1981 | Herwig et al. | 250/353 |
| 4,275,303 | 6/1981 | Mudge | 250/342 |
| 4,317,998 | 3/1982 | Dore | 250/342 |
| 4,429,224 | 1/1984 | Wägli et al. | 250/342 |
| 4,442,359 | 4/1984 | Lederer | 250/353 |
| 4,451,734 | 5/1984 | St. Jean et al. | 250/342 |

FOREIGN PATENT DOCUMENTS

| | | |
|---|---|---|
| 0050751 | 5/1982 | European Pat. Off. . |
| 0094653 | 11/1983 | European Pat. Off. . |
| 2653111 | 12/1977 | Fed. Rep. of Germany . |

*Primary Examiner*—Carolyn E. Fields
*Attorney, Agent, or Firm*—Brumbaugh, Graves, Donohue & Raymond

[57] ABSTRACT

A compact passive infrared detector is provided with a plane mirror which reflects infrared radiation focused by a lens onto a detector arranged between the lens and the reflector.

5 Claims, 4 Drawing Figures

COMPACT PASSIVE INFRARED INTRUSION SENSOR

BACKGROUND OF THE INVENTION

This invention relates to intrusion sensors, and particularly to passive infrared intrusion sensors which make use of a focusing lens for focusing self-emitted infrared radiation from an intruder onto an infrared radiation detector for purposes of sensing the presence of the intruder.

In connection with passive infrared intrusion sensors, it is generally desirable to make the sensor as unobstrusive as possible to an intruder, so that an intruder cannot easily avoid passing into a zone of detection of the intrusion sensor by observation of the device itself as installed on a protected premises. One approach to making such devices less noticeable to a casual intruder is to make the devices as small as possible.

It is an object of the present invention to provide a passive infrared intrusion sensor which is compact compared to similar devices known in the prior art.

SUMMARY OF THE INVENTION

In accordance with the present invention there is provided a compact passive infrared intrusion sensor which comprises an enclosure having an opening for receiving infrared radiation and a lens arranged in the opening for focusing infrared radiation. A plane reflector is arranged in the enclosure opposite the opening for reflecting infrared radiation received through the opening. An infrared detector is arranged between the lens and the reflector facing the reflector. The spacing of the lens and the detector from the reflector is selected to cause the lens to focus infrared radiation on the detector.

In a preferred embodiment the sensor includes electronic circuit components which are arranged in the enclosure outside of the optical path between the detector and the lens via the reflector. The components may be arranged on a printed circuit board having a central area which comprises the reflector. In this embodiment the components are mounted on peripheral areas of the board. In another embodiment the reflector comprises an interior wall of the enclosure. In this case, the circuit board can be mounted between the reflector wall and the lens and the board can be provided with an aperture in the region which corresponds to the optical path between the detector and the lens via the reflector.

In accordance with the invention a sensor of the type having a lens mounted on an enclosure for focusing infrared radiation onto a detector is improved so that there is provided a plane reflector opposite the lens and wherein the detector faces the reflector.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
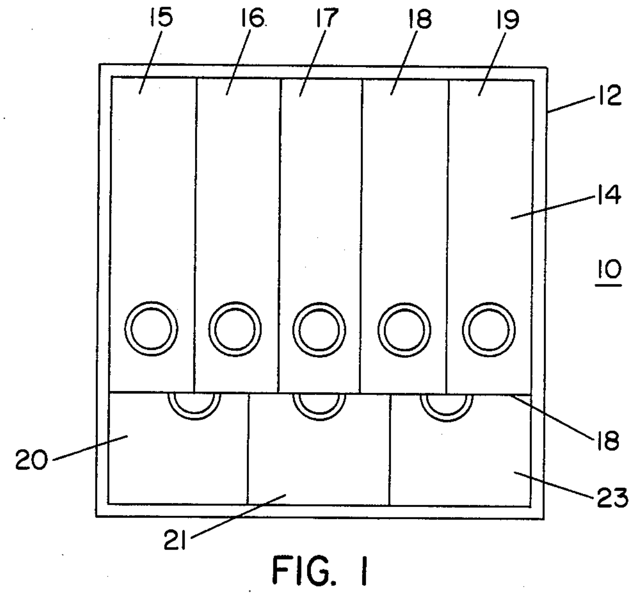
FIG. 1 is a front elevation view of a compact passive infrared intrusion sensor in accordance with the present invention.
Figure 2:
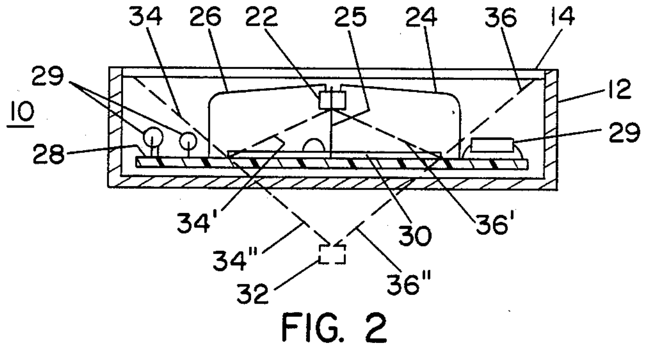
FIG. 2 is a cross-section view of the intrusion sensor of FIG. 1.
Figure 3:
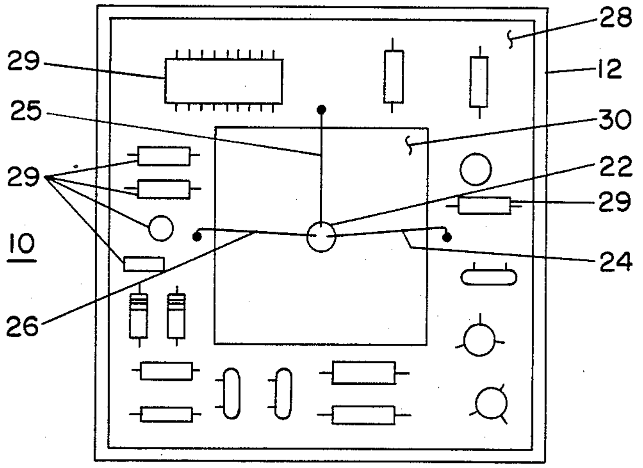
FIG. 3 is a front elevation view of the intrusion sensor of FIG. 1 with the lens removed.

The present invention will be described with respect to an exemplary embodiment which is illustrated in FIGS. 1 through 3. Referring generally to FIGS. 1 to 3, there is shown a passive infrared intrusion sensor 10 which includes a rectangular enclousre 12 having an opening covered by a lens 14. In the exemplary embodiment lens 14 is a Fresnel lens which has eight sections 15, 16, 17, 18, 19, 20, 21 and 23 for providing eight beams of infrared intrusion sensitivity. Lens sections 15 through 19 are arranged to provide five outwardly pointing, long range beams of sensitivity when the sensor 10 is mounted on a vertical wall. Lens segments 20, 21 and 23 provide three lower pointing and spaced apart beams of sensitivity when the sensor 10 is mounted on a vertical wall. Those skilied in the art will recognize that various changes and modifications are typically made in the arrangement of sensitivity beams according to the desires of the manufacturer. The detector has infrared radiation in each beam which has a range determined by the area of the lens segment and has an angular orientation which is determined by the angular relationship between the lens center and the virtual location of the infrared sensing element, as is understood by those skilled in the art.

Referring to FIG. 2, which is a cross-sectional view of the compact sensor 10 of FIG. 1, it is apparent that the enclosure 12 includes a circuit board 28, on which there are mounted a variety of circuit components 29. The infrared sensing element 22 is mounted to circuit board 28 by its leads 24, 25 and 26. As is more easily visible in the view of FIG. 3, circuit board 28 is provided with a metallic clad central area 30, which is highly polished, and possibly plated, to provide an infrared reflecting plane mirror. The circuit components 29 are arranged around the periphery of the circuit board outside of the optical path between lens 14 and infrared sensing element 22 via reflection in mirrored portion 30, so that the circuit components do not obstruct the optical operation of the device.

The operation of the device of FIGS. 1 through 3 is easily understood by reference to FIG. 2 which shows the outer most optical paths between lens 14 and infrared detecting elment 22. Path 34 is reflected by mirror 30 into path 34' which terminates in detecting element 22. Likewise, the opposite peripheral path 36 is deflected by mirror 30 into path 36' which intersects detecting element 22. The presence of plane reflector 30 is equivalent to providing an infrared sensing element at the virtual image location 32, so that path segments 34' and 36' are equivalent to virtual path segments 34" and 36".

The effect of providing the plane reflector which images the infrared detecting element 22 with respect to lens 14 is to enable the construction of an infrared sensor in an enclosure which is smaller than would be required by a sensor having a lens with the same focal distance but without a plane reflecting surface to focus received infrared radiation onto the reflector. In the embodiment illustrated in FIGS. 1 through 3 the infrared detecting element 22 is arranged with its sensitive surface facing downward toward plane reflector 30 and supported by leads 24, 25 and 26 which are mounted to circuit board 28. It will be evident to those skilled in the art that other mounting configurations for infrared detecting element 22 are possible, including, for example, the use of infrared transparent structural material.

Figure 4:
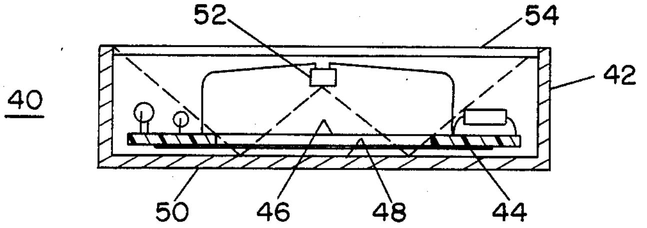
FIG. 4 is a cross-section view of an alternate embodiment of compact intrusion sensor in accordance with the present invention.

FIG. 4 is a cross-section view of an alternate embodiment of a sensor 40 in accordance with the present invention. Sensor 40 includes an enclosure 42, which is substantially the same as the enclosure 12 used with sensor 10. In the embodiment illustrated in FIG. 4, the plane reflecting surface 48 is located on the inside of a rear wall 50 of enclosure 42. Circuit board 44 is provided with a central square aperture, approximately corresponding to the reflected optical path between infrared detecting element 52 and lens 54. Those skilled in the art will recognize that the arrangement of the sensor 40 illustrated in FIG. 4 may provide slightly more compact arrangement for a sensor than the arrangement illustrated in FIGS. 1 through 3.

While there have been described what are believed to be the preferred embodiment of the present invention, those skilled in the art will recognize that other and further modifications may be made thereto without departing from the spirit of the invention, and its intended to claim all such embodiments as fall within the true scope of the invention.

I claim:

1. A compact infrared intrusion sensor comprising:

an enclosure having an opening for receiving infrared radiation;

a lens including a plurality of lens segments arranged in said opening for focusing infrared radiation;

a single plane reflector arranged in said enclosure opposite said opening and substantially parallel to said lens for reflecting infrared radiation received through said opening;

and an infrared detector arranged between said lens and said reflector and facing said reflector, the spacing of said lens and said detector from said reflector being selected to cause said lens to focus infrared radiation onto said detector, said reflector having dimensions selected to provide a reflected optical path between the periphery of said lens and said infrared detector.

2. A sensor as specified in claim 1 further including electronic circuit components, said components being arranged in said enclosure outside the optical path between said detector and said lens via said reflector.

3. A sensor as specified in claim 2 further including a printed circuit board, wherein said board has a central area with a plane metallic surface comprising said reflector and wherein said components are mounted on peripheral areas of said board.

4. A sensor as specified in claim 1 wherein said reflector comprises a wall of said enclosure.

5. A sensor as specified in claim 4 wherein there is provided a circuit board in said enclosure, mounted between said reflector wall and said lens, and wherein said circuit board has an aperture in the region of said board corresponding to the optical path between said detector and said lens via said reflector.

* * * * *